May 3, 1966     ONG TJING GIE ETAL     3,249,662
METHOD OF MANUFACTURING CERAMIC ARTICLES BY
SINTERING PREFORMED BODIES AND CERAMIC
ARTICLES THUS MANUFACTURED
Filed Jan. 8, 1963
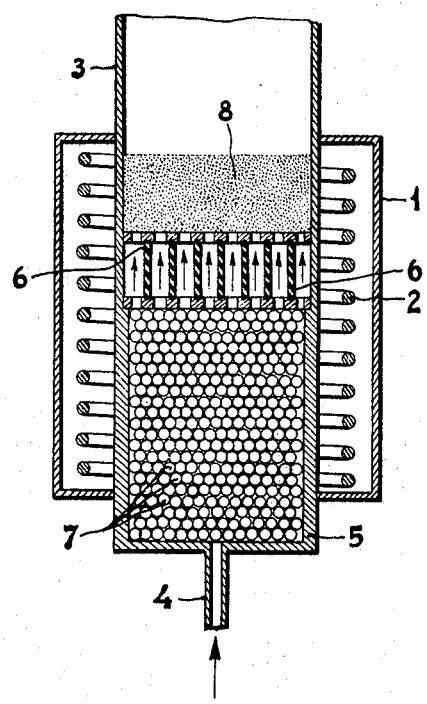
INVENTORS
ONG TJING GIE
HANS TIELROOY
LODEWIJK J.M. BIEMANS
BY
AGENT

United States Patent Office 3,249,662
Patented May 3, 1966

3,249,662
METHOD OF MANUFACTURING CERAMIC ARTICLES BY SINTERING PREFORMED BODIES AND CERAMIC ARTICLES THUS MANUFACTURED
Ong Tjing Gie, Hans Tielrooy, and Lodewijk Joseph Maria Biemans, Emmasingel, Eindhoven, Netherlands, assignors to North American Philips Company, Inc., New York, N.Y., a corporation of Delaware
Filed Jan. 8, 1963, Ser. No. 250,052
Claims priority, application Netherlands, Jan. 10, 1962, 273,415
4 Claims. (Cl. 264—57)

The invention relates to a method of manufacturing ceramic articles by sintering preformed bodies and to ceramic articles thus manufactured.

As is known, ceramic articles are usually manufactured by bringing a possibly pre-treated starting material, to which a binding agent has been added, in the desired form and heating the thus obtained pre-formed bodies in a furnace. In most of the cases it is not easy, particularly when comparatively large furnaces are used, to ensure such a temperature homogeneity in the furnace that the bodies contained therein are all uniformly heated. Also there often is some spreading in the heat supply to the various parts of the surface of one and the same body, on the one hand as the result of gas flows in the furnace, on the other hand because the supply of heat to those parts of the surface of the bodies to be sintered which are in direct contact with the firing plate or the supporting member is effected in a somewhat different manner than to the rest of the surface.

The above drawbacks are not decisive in the manufacture of many ceramic articles. However, this becomes quite different for the manufacture of ceramic articles for devices, for example ceramic capacitors, resistors, magnet cores and magnets. Usually these must meet very stringent specifications, while the desired electrical properties must be reproducible to a large extent and must consequently remain within certain tolerance limits which are often very close together.

For the preparation of ceramic powders by heating at temperatures to approximately 900–1000° C. of a granulated mixture of the starting substances, the so-called "fluid-bed" method has been used. In this case the granulate in the form of an undulating layer of fine grains is heated on a grid through which a gas, for example air, is blown in the upward direction. The rate of the supply of gas naturally lies between limits which are chosen very accurately. This fluid-bed method guarantees a supply of heat to the grains to be heated which is uniform on all sides, as well as a high thermal efficiency. However, if one tries to apply this method to the manufacture of ceramic articles from preformed bodies, for which purpose, in general, temperatures are required which are considerably higher than 1000° C., for example from 1200–1500° C., the difficulty is encountered that these bodies show a strong tendency of conglomerating and/or of sticking to the wall of the furnace. This drawback is of a nature such that so far it has hampered the practical application of the fluid-bed method for the manufacture of ceramic articles.

The invention removes the above drawback and thereby renders the fluid-bed method suitable for the manufacture of ceramic articles. According to the invention, the fluid-bed is also supported by a granular material which is stable at the sintering temperature and which, in the fluid-bed, behaves like an inert substance with respect to the bodies to be sintered and/or the resulting ceramic articles, that is to say, it does not conglomerate and does not react chemically with it. Such a material is, for example, aluminum oxide or zirconium oxide, preferably pre-sintered.

The refractory granular material and the bodies to be sintered may be supplied, if desired, collectively to the space within the furnace, but it is also possible first to supply a given quantity of said material to the space within the furnace and only then bring the bodies to be sintered, if desired together with another quantity of the above material, into the fluid-bed already formed. When using the invention, conglomeration of the bodies to be sintered and sticking of the bodies to be sintered to the wall of the furnace are avoided entirely and the above-mentioned advantages of the fluid-bed method (heating in a uniform manner on all sides and a high thermal efficiency) are fully realized.

The method according to the invention is particularly suitable for the manufacture of ceramic bodies of comparatively low weight and comparatively small dimensions, for example ceramic plates having a thickness of under 100 microns, or ferrite rings for so-called "magnetic memories," which ferrite rings usually are not heavier than a few milligrams. In principle, naturally, also somewhat larger and heavier ceramic articles may be manufactured, provided the speed of the gas supply which is to maintain the fluid-bed, and possibly the particle size of the refractory granular material are adapted thereto.

If desired, the fluid-bed may be transferred to another furnace, or another reaction vessel in which another temperature prevails and/or in which the gas atmosphere has a composition differing from that in the first furnace or in the first reaction vessel. Naturally, this measure may also be repeated.

In order that the invention may readily be carried into effect, two examples thereof will now be described more fully, by way of example, with reference to the accompanying drawing which shows a diagrammatic embodiment of a furnace according to the invention.

*Example I*

A ferrite material is prepared from a mixture of 43 mol. percent of $Fe_2O_3$, 52 mol. percent of $MnCO_3$ and 5 mol. percent of CuO by heating at a temperature of approximately 750° C. (so-called "pre-firing"), the material being pulverized and, after the addition of a binding agent, compressed in the form of rings having an outside diameter of 1.59 mm., an inside diameter of 0.95 mm. and a thickness of 0.37 mm.

In the diagrammatic drawing, reference numeral 1 denotes a furnace which is provided with an electric heating element 2. At the bottom in the reaction vessel 3 having walls consisting of a refractory steel, air is blown in through the pipe 4. Instead of air, a stronger or less strongly oxidizing or even reducing gas mixture may be blown into the reaction vessel dependent upon the nature of the ceramic articles to be manufactured. If desired, the composition also of the gas mixture may be varied during operation of the furnace. The lower section of the reaction vessel is bounded by an additional wall 5 of a refractory material and by a grid 6. This grid consists of a number of tiles placed against each other and provided with recesses which tiles consist of a refractory ceramic material. In the lower section of the reaction vessel which is filled with balls 7 of a refractory ceramic material, the gas flowing in through the pipe 4 is heated and distributed evenly over the whole surface of the grid.

After having adjusted the temperature in the reaction vessel 3 above the grid 6 at approximately 1250° C., pre-sintered aluminum oxide grains are scattered on the grid and the current of air is controlled so that the grains on the grid remain in an undulating motion, in other words form a fluid-bed on it. In this fluid-bed (8) the above-mentioned ferrite rings are scattered, if desired together with a quantity of the above-mentioned aluminum oxide grains.

After some time the temperature of the fluid-bed is reduced from approximately 1250° C. to approximately 900° C. After another few minutes the hot contents of the furnace are poured into a steel trough in which it is allowed to cool further. After the sintered ferrite rings have been cooled to room temperature, they can easily be separated from the aluminum oxide by means of a magnet. They have a substantially rectangular hysteresis loop and are suitable for use in magnetic memories.

*Example II*

From a product, obtained by pre-firing a mixture of 44.5 mol. percent of $BaCO_3$, 28 mol. percent of $CaSO_4$, 43.1 mol. percent of $TiO_2$ and 9.6 mol. percent of ZrO followed by grinding, plates are compressed after the addition of a binding agent, having a diameter of 10 mm. and a thickness of 200 microns. These plates, together with a quantity of granular aluminum oxide as stated in Example I, are scattered on the grid of the furnace described in Example I. A fluid-bed is formed on this grid under the influence of an upward air current, the temperature of the fluid-bed being adjusted at approximately 1360° C.

After a few minutes, the contents of the furnace are poured into a steel trough. The sintered plates are separated from the aluminum oxide by means of a sieve. They may be used as a dielectric in capacitors.

While we have described our invention in connection with the foregoing illustrative examples, it should be clearly understood that the invention is not limited thereto, the invention being defined in the appended claims.

What is claimed is:

1. A method of manufacturing ceramic articles comprising the steps, forming a layer of a granular material on an apertured surface within a furnace, placing pre-formed bodies of ceramic material on the layer of granular material which is stable at temperatures at which the articles are subsequently sintered to form coherent bodies, said granular material being inert at said sintering temperature to said bodies being sintered, and passing a stream of gas through said layer of granular material at a temperature at which said bodies are sintered and said granular material undulates and becomes a fluid bed whereby said bodies are uniformly heated to the sintering temperature thereof.

2. A method of manufacturing ceramic articles comprising the steps, forming a layer of granular aluminum oxide on a grid within a furnace, placing pre-formed bodies of ceramic material on the layer of aluminum oxide, and passing a stream of gas heated to a temperature at which said bodies are sintered and said granular material undulates and becomes a fluid bed whereby said bodies are uniformly heated and sintered.

3. A method of manufacturing ferrite articles comprising the steps, placing prefired bodies prepared by heating a mixture of about 43 mol percent of $Fe_2O_3$, about 52 mol percent of $MnCO_3$, and about 5 mol percent of CuO in a layer of granular aluminum oxide, and passing a stream of air at a temperature of about 1250° C. through said layer of aluminum oxide to sinter said bodies.

4. A method of manufacturing ceramic articles comprising the steps, placing bodies composed of a prefired mixture of about 44.5 mol percent of $BaCO_3$, about 28 mol percent of $CaSO_4$, about 43.1 mol percent of $TiO_2$ and about 9.6 mol percent of ZrO on a layer of granular aluminum oxides, and passing a stream of air heated to a temperature of about 1360° C. through the aluminum oxide layer to sinter the bodies.

References Cited by the Examiner

UNITED STATES PATENTS

| | | |
|---|---|---|
| 2,833,622 | 5/1958 | Roberts. |
| 2,968,551 | 1/1961 | North _____ 264—57 |
| 2,985,939 | 5/1961 | Brockman. |
| 3,025,385 | 3/1962 | Tanaka. |

ROBERT F. WHITE, *Primary Examiner.*

ALEXANDER H. BRODMERKEL, *Examiner.*

R. B. MOFFIT, *Assistant Examiner.*